United States Patent [19]
Ikeda et al.

[11] Patent Number: 5,357,496
[45] Date of Patent: Oct. 18, 1994

[54] OPTICAL DISK DRIVE FOCUS SERVO CONTROL SYSTEM WITH FOCUS SERVO BEING TURNED OFF OR HAVING GAIN REDUCED AFTER TRACKING SERVO HAS BEEN OFF A PREDETERMINED TIME PERIOD

[75] Inventors: Toru Ikeda; Shigenori Yanagi, both of Kawasaki, Japan

[73] Assignee: Fujitsu Limited, Japan

[21] Appl. No.: 188,357

[22] Filed: Jan. 27, 1994

Related U.S. Application Data

[63] Continuation of Ser. No. 20,209, Feb. 19, 1993, abandoned.

Foreign Application Priority Data

Feb. 27, 1992 [JP] Japan .................................. 4-041220

[51] Int. Cl.⁵ .............................................. G11B 7/095
[52] U.S. Cl. ................... 369/44.29; 369/44.32; 369/44.35; 369/54
[58] Field of Search ............ 369/32, 44.25, 44.28, 369/44.29, 44.32, 44.35, 44.36, 54, 58

[56] References Cited

U.S. PATENT DOCUMENTS

| | | | |
|---|---|---|---|
| 4,613,963 | 9/1986 | Hirano | 369/44.29 X |
| 5,103,439 | 4/1992 | Bierhoff et al. | 369/44.29 X |
| 5,146,443 | 9/1992 | Iwase et al. | 369/44.29 |

FOREIGN PATENT DOCUMENTS

| | | |
|---|---|---|
| 60-47236 | 3/1985 | Japan . |
| 63-237223 | 10/1988 | Japan . |
| 64-1172 | 1/1989 | Japan . |
| 2-53226 | 2/1990 | Japan . |
| 2183428 | 7/1990 | Japan . |
| 3256227 | 11/1991 | Japan . |

*Primary Examiner*—W. R. Young
*Attorney, Agent, or Firm*—Greer, Burns & Crain, Ltd.

[57] ABSTRACT

A focus servo control system for use in optical disk drive units prevents a large current from continuously flowing through a focus actuator coil FC when a focus error signal FES in the focus servo loop increases while a track servo loop is in an "off" state, thereby preventing deterioration of the coil FC. The focus servo control further includes a controller for detecting a length of time during which an "off" state of the track servo loop in a servo controller continues, and for turning off the focus servo loop or, alternatively, reducing the gain of the focus servo loop when the detected length of time exceeds a predetermined value.

13 Claims, 12 Drawing Sheets

① TES
② REFLECTION SURFACE OF OPTICAL DISK
③ TRACK ZERO SIGNAL
④ OFF TRACK SIGNAL

Fig. 6

① FES
② FOCUS ZERO CROSSING SIGNAL
③ OFF FOCUS SIGNAL

OPTICAL DISK DRIVE FOCUS SERVO CONTROL SYSTEM WITH FOCUS SERVO BEING TURNED OFF OR HAVING GAIN REDUCED AFTER TRACKING SERVO HAS BEEN OFF A PREDETERMINED TIME PERIOD

This is a continuation of co-pending application Ser. No. 08/020,209, filed Feb. 19, 1993, now abandoned.

BACKGROUND OF THE INVENTION

1. Field of the Invention

The present invention relates to a servo control system used in an optical disk drive unit to correctly focus illuminating light onto the data recording surface of an optical disk. More specifically, the present invention relates to a focus servo control system provided in an optical disk drive unit and having a track servo loop for positioning an optical head at a predetermined point above the desired track on an optical disk and a focus servo loop for controlling the focus of a spot of light applied to the optical disk from a laser light source provided in the optical head. The focus servo control system controls the focus servo loop on the basis of the "on/off" state of the track servo loop.

2. Description of the Related Art

Recently, various digital data recorders have been developed actively. Among them is the optical disk drive unit. Since it enables writing and/or erasing of data at high density and also allows transfer of data at high rate, the optical disk drive unit is recognized as the most attractive device.

Figure 1:
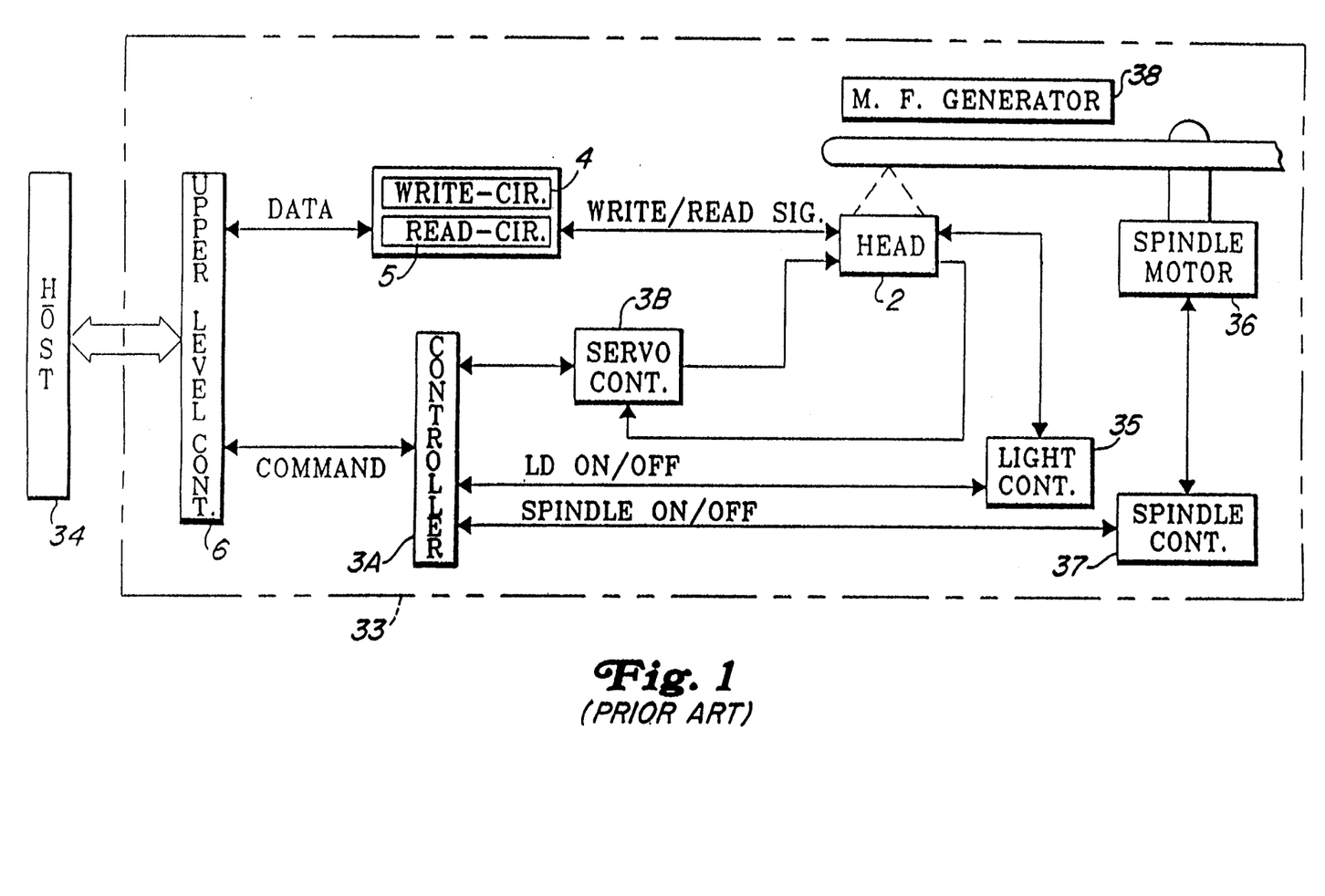
FIG. 1 is a block diagram showing the arrangement of a typical optical disk drive unit.

FIG. 1 is a block diagram showing the arrangement of a typical optical disk drive unit, which is denoted by reference numeral 33. The optical disk drive unit 33 is connected to and controlled by a host computer 34. The optical disk drive unit 33 has some controllers, for example, an upper-level controller 6, a controller 3A, a servo controller 3B, a light-volume controller 35, and a spindle controller 37.

Reference numeral 1 denotes an optical disk, which is driven by a spindle motor 36 that is controlled by the spindle controller 37. Further, reference numeral 38 denotes a magnetic field generator, which enables data to be written to and read from the optical disk 1 by an optical head, which is denoted by reference numeral 2. The optical head 2 is moved radially of the optical disk 1 by a voice coil motor (not shown) and positioned to a sought track.

The upper-level controller 6 serves as an interface between the optical disk drive unit 33 and the host computer 34. In response to control commands from the host computer 34, the upper-level controller 6 sends data to be written to a write-circuit 4 and receives read-data from a read-circuit 5.

In response to a write instruction from the upper-level controller 6, the write-circuit 4 transfers data to be written to the optical head 2 and controls the power of light emitted from a light source (laser diode) provided in the optical head 2 during writing.

In response to a read instruction, the read-circuit 5 binalizes data read by the optical head 2 and transfers a clock signal and the read-data, which is synchronized therewith, to the upper-level controller 6.

In this optical disk unit 33, the servo controller 3B constitutes servo loops that control the optical head 2 under control of the controller 3A. The servo loops include a track servo loop and a focus servo loop.

The track servo loop executes control so as to move the optical head 2 to a predetermined position above the desired track on the basis of a seek instruction from the upper-level controller 6 or the signal read by the optical head 2 under control of the controller 3A.

On the other hand, the focus servo loop controls the focus of a spot of light from the laser light source on the basis of the signal read.

More specifically, the optical head 2 is moved radially of the optical disk 1 so as to be positioned above the desired track under control of the track servo loop. In addition, in order to control the focus of the spot of light from the laser light source, the optical head 2 is moved perpendicularly to the surface of the optical disk 1 under control of the focus servo loop.

In the above-described track and focus servo loops, servo error signals (i.e., a track error signal TES and a focus error signal FES, respectively) are generated in accordance with differences between the target and present positions of the optical head 2.

These servo error signals are passed through respective amplifiers and led to respective optical head movement control circuits, that is, a track actuator coil TC for positioning the optical head 2 to the desired track, and a focus actuator coil FC for moving the optical head 2 perpendicularly to the optical disk 1 to control the focus of the spot of light from the laser light source.

Incidentally, since the optical disk 1 has tracks spirally formed thereon, the track servo loop needs to execute kickback control for each full turn of the optical disk 1 in order to maintain the optical head 2 above the same track. Each time the optical head 2 crosses one track, a peculiar sine waveform appears in the track error signal TES.

In the focus error signal FES in the focus servo loop also, a peculiar waveform appears in correspondence to the sine waveform due to crosstalk, although this peculiar waveform is minute.

In a normal state, the track servo loop is in an "on" state except when it is turned off in response to a command from the controller 6. However, when it is difficult to perform normal tracking due to, for example, a flaw in the surface of the optical disk 1, the track servo system is turned off. In such a case, the waveforms of the track and focus error signals TES and FES become disordered. In particular, when the optical disk 1 has a large eccentricity, the frequency, that is, the number of times, at which the optical head 2 crosses a track increases. Consequently, there is an increase in the current that is passed through the focus actuator coil FC of the optical head 2 for the focus control.

If this state continues long, the temperature of the focus actuator coil FC rises, causing the coil FC to be deteriorated, resulting in a decrease in the lifetime of the coil FC.

BRIEF DESCRIPTION OF THE INVENTION

Accordingly, it is an object of the present invention to provide a focus servo control system for use in optical disk drive units, in which a large current is prevented from continuously flowing through the focus actuator coil FC when the focus error signal FES increases while the track servo loop is in an "off" state, thereby preventing deterioration of the coil FC.

It is another object of the present invention to provide a focus servo control system having an overcurrent detector, which detects a large current that may invite a situation which can be considered to be destruction of the system, wherein an overcurrent of the focus error signal FES in the focus servo loop, which is smaller than the above-described large current and hence cannot be detected by the overcurrent detector, is prevented from flowing through the focus actuator coil FC.

It is still another object of the present invention to provide a focus servo control system for an optical disk drive unit, which includes a laser light source, an optical disk having a data recording surface illuminated with a spot of light from the laser light source, an optical head for receiving reflected light from the optical disk surface, which corresponds to the spot of light applied to the optical disk surface, and for obtaining an electric signal corresponding to the received light, a servo controller having a track servo loop for moving the optical head radially of the optical disk on the basis of an error signal obtained from the electric signal, which is obtained by the optical head, and a focus servo loop for controlling the focus of the spot of light by moving the optical head perpendicularly to the surface of the optical disk on the basis of an error signal obtained from the electric signal, which is obtained by the optical head, and a controller for detecting a length of time during which an "off" state of the track servo loop in the servo controller continues, and for turning off the focus servo loop when the detected length of time exceeds a predetermined value.

It is a further object of the present invention to provide a focus servo control system for an optical disk drive unit, which includes a laser light source, an optical disk having a data recording surface illuminated with a spot of light from the laser light source, an optical head for receiving reflected light from the optical disk surface, which corresponds to the spot of light applied to the optical disk surface, and for obtaining an electric signal corresponding to the received light, a servo controller having a track servo loop for moving the optical head radially of the optical disk on the basis of an error signal obtained from the electric signal, which is obtained by the optical head, and a focus servo loop for controlling the focus of the spot of light by moving the optical head perpendicularly to the surface of the optical disk on the basis of an error signal obtained from the electric signal, which is obtained by the optical head, and a controller for detecting a length of time during which an "off" state of the track servo loop in the servo controller continues, and for reducing the gain of the focus servo loop when the detected length of time exceeds a predetermined value.

According to the present invention, when the track servo loop is off, it is possible to prevent an overcurrent from flowing through the focus servo loop. Accordingly, the focus actuator coil FC will not be deteriorated. Further, the flow of an overcurrent in the focus servo loop can be prevented with a simple circuit. Therefore, the reliability of the optical disk drive unit improves.

Further, according to the present invention, an overcurrent which is so small that it cannot be detected by the overcurrent detector, which is provided for each of the track and focus servo loops, is cut off or suppressed. Thus, deterioration of the focus actuator coil FC can be prevented.

The above and other features and advantages of the present invention will be readily understood and become more apparent from the following description, taken in conjunction with the accompanying drawings.

BRIEF DESCRIPTION OF THE DRAWINGS

FIG. 7 shows waveforms in a normal state where the track servo loop is on.

DESCRIPTION OF THE PREFERRED EMBODIMENTS

Prior to the description of embodiments of the present invention, a conventional system and problems attendant thereon, particularly constituent portions common to the conventional system and that of the present invention, will be explained in detail for a better understanding of the invention.

Figure 2:
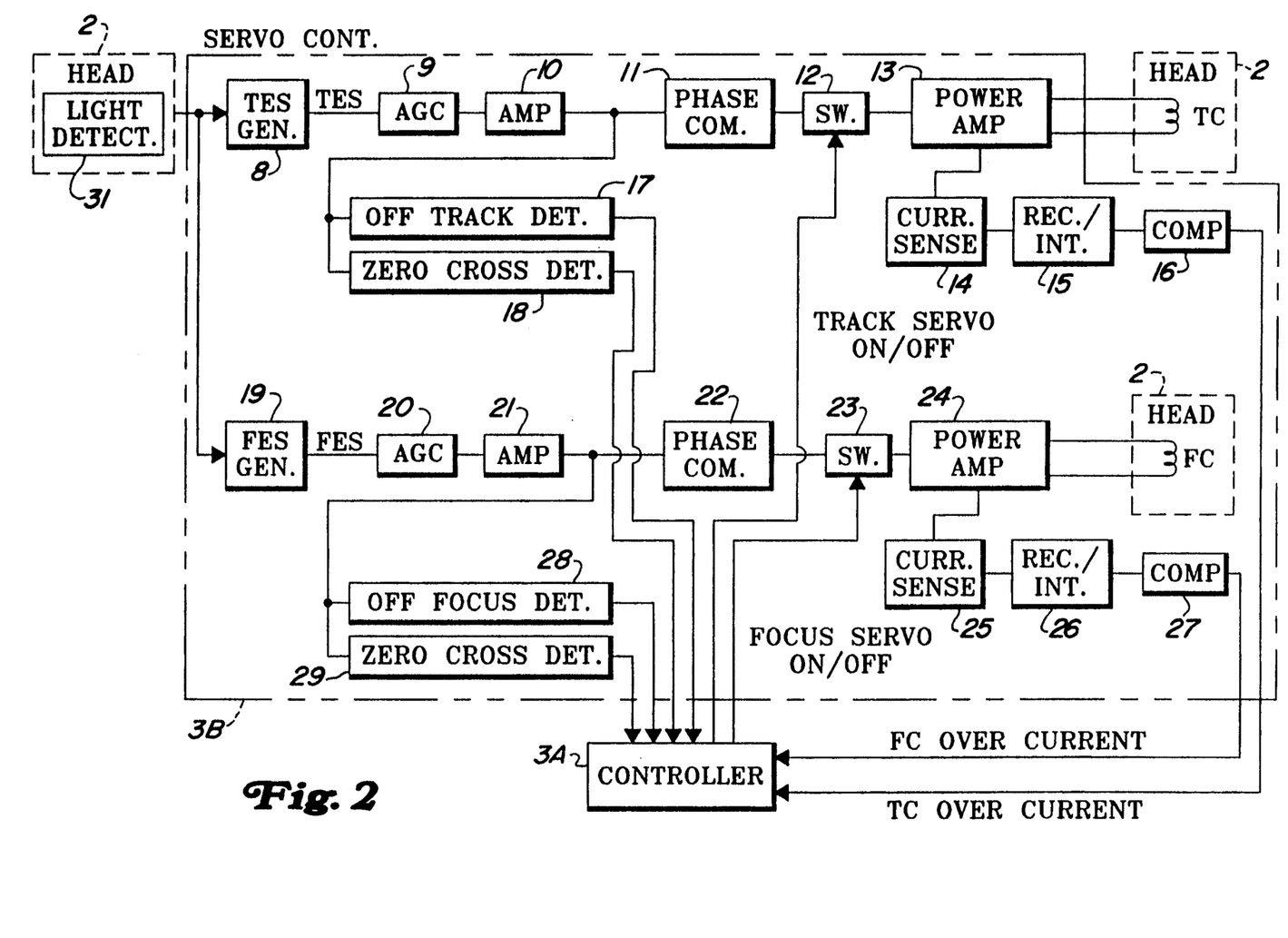
FIG. 2 is a block diagram showing in detail the arrangement of the servo controller 3B in the optical disk drive unit 33 shown in FIG. 1.

FIG. 2 is a block diagram showing in detail the arrangement of the servo controller 3B in the optical disk drive unit 33 as shown in FIG. 1. FIG. 2 further shows the optical head 2 and the controller 3A in connection with the servo controller 3B.

The servo controller 3B is provided with a track servo loop and a focus servo loop, as has already been described. The track servo loop has a track error signal (TES) generator 8, an AGC (automatic gain controller) 9, a fixed-gain amplifier 10, a phase compensator 11, a switch 12, a power amplifier 13, an off track detector 17, a track zero crossing detector 18, a current sensor 14, a rectifier/integrator 15, and a comparator 16.

On the other hand, the focus servo loop has a focus error signal (FES) generator 19, an AGC 20, a fixed-gain amplifier 21, a phase compensator 22, a switch 23, a power amplifier 24, an off focus detector 28, a focus zero crossing detector 29, a current sensor 25, a rectifier/integrator 26, and a comparator 27.

Further, the track error signal generator 8 in the track servo loop and the focus error signal generator 19 in the focus servo loop are connected to a light detector 31 in the optical head 2. The power amplifier 13 in the track servo loop and the power amplifier 24 in the focus servo loop are connected to the track actuator coil TC and the focus actuator coil FC, respectively, in the optical head 2.

The current sensor 14, the rectifier/integrator 15 and the comparator 16 constitute an overcurrent detector for the track servo loop, whereas the current sensor 25, the rectifier/integrator 26 and the comparator 27 constitute an overcurrent detector for the focus servo loop.

An outline of the operation of the servo controller 3B, arranged as described above, will be given below.

Signal light reflected from the optical disk 1, which is detected by the light detector 31 in the optical head 2, is input to both the track error signal generator 8 and the focus error signal generator 19. The track error signal generator 8 generates a track error signal TES, while the focus error signal generator 19 generates a focus error signal FES.

Figure 3:
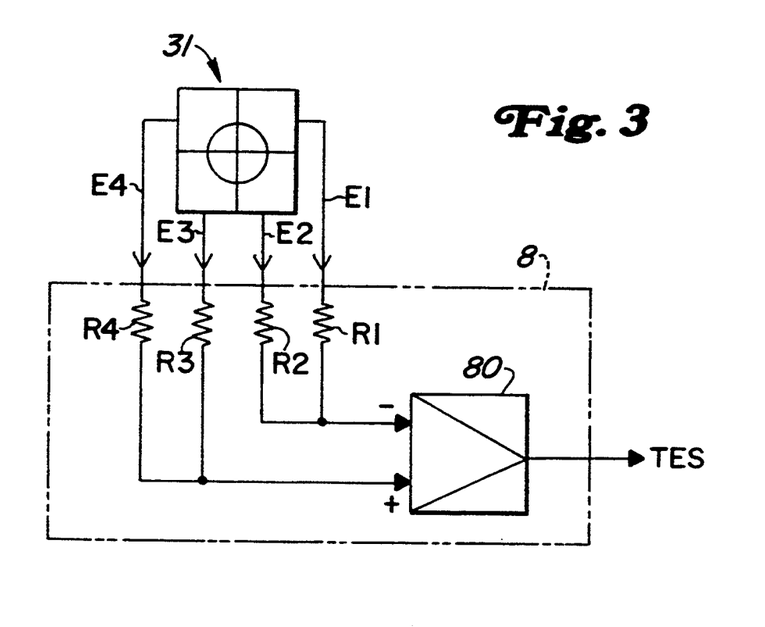
FIG. 3 shows the relationship between a light detector 31 and a track error signal generator 8.

The light detector 31 may be arranged, for example as shown in FIG. 3. It should be noted that FIG. 3 illustrates particularly the relationship between the light detector 31 and the track error signal generator 8, and another light detector 31, having a similar arrangement, is provided for the focus error signal FES.

Referring to FIG. 3, the light detector 31 for the track error signal TES has four divided light-receiving portions, which are arranged to output signals E1, E2, E3 and E4 corresponding to the quantities of light received thereby, respectively.

These signals E1, E2, E3 and E4 are input to the track error signal generator 8. The signals E1 and E2 are added together through resistors R1 and R2, while the signals E3 and E4 are added together through resistors R3 and R4. The resulting sum signal (E1+E2) is applied to the minus input terminal of a differential amplifier 80, while the sum signal (E3+E4) is applied to the plus input terminal of the differential amplifier 80. The differential amplifier 80 outputs a track error signal TES as a difference between the two sum signals. Such a method of generating a track error signal TES is known as the push-pull method (far field method).

Generation of the focus error signal FES is effected by the focus error signal generator 19, which is connected to another light detector 31 that similarly has four divided light-receiving portions arranged to output signals E1, E2, E3 and E4 corresponding to the quantities of light received thereby, respectively. That is, the signals E1, E2, E3 and E4 from the light detector 31 are subjected to addition and subtraction in the focus error signal generator 19, thereby a focus error signal FES being generated.

Referring back to FIG. 2, the track error signal TES is input to the AGC 9 where it is formed into a signal of constant amplitude. The output of the AGC 9 is input through the fixed-gain amplifier 10 to the phase compensator 11 where the phase of a high-frequency component of the output signal is advanced. The resulting signal is then amplified in the power amplifier 13 to drive the track actuator coil TC.

The track actuator coil TC is incorporated in the track servo loop and driven so that the track error signal becomes zero (that is, so that the laser beam is focused on the center of the desired track).

The off track detector 17 is used to detect whether or not a track is present when the track servo loop is off. When the track servo loop is on, the off track detector 17 is used for detection of an amount of offset of the beam focus from the center of the given track, that is, an abnormality in the track servo loop.

The track zero crossing detector 18 is used to count the number of tracks crossed during being sought. The switch 12 is used to turn on/off the track servo loop under control of the controller 3A.

On the other hand, the focus error signal FES is input to the AGC 20 where it is formed into a signal of constant amplitude. The output of the AGC 20 is input through the fixed-gain amplifier 21 to the phase compensator 22 where the phase of a high-frequency component of the output signal is advanced, and the resulting signal is amplified in the power amplifier 24. Thereafter, the amplified signal is used to drive the focus actuator coil FC. The focus actuator coil FC is incorporated in the focus servo loop and driven so that the focus error signal FES becomes zero (that is, so that the laser beam is focused on the data recording surface of the optical disk 1).

The off focus detector 28 is used to search for a point of correct focus. When the track servo loop is off, the off focus detector 28 detects an amount of offset of the beam focus from the data recording surface of the optical disk 1, that is, an abnormality in the focus servo loop. The focus zero crossing detector 29 is used for the focus searching operation. The switch 23 is used to turn/off the focus servo loop under control of the controller 3A.

The track and focus servo loops are constructed as described above.

Figure 4:
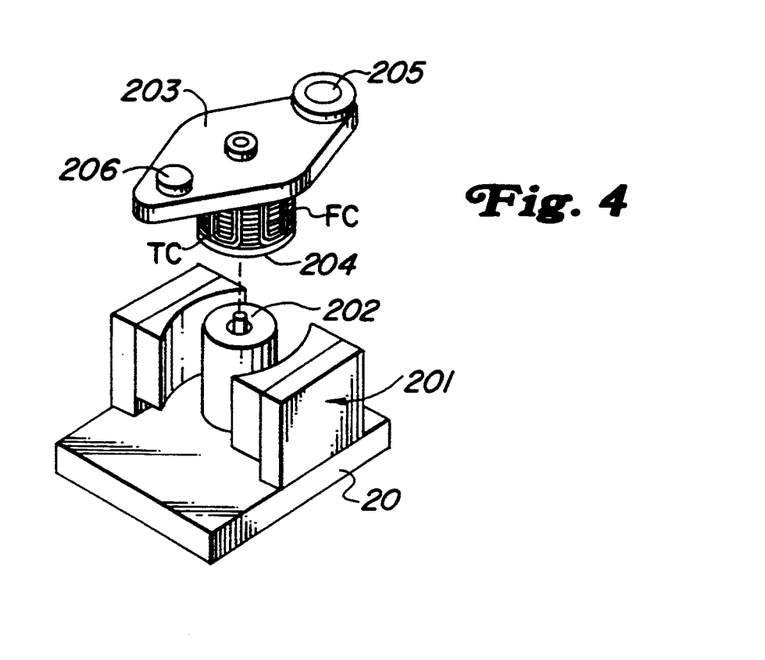
FIG. 4 shows a track actuator coil TC and a focus actuator coil FC.

FIG. 4 is a view for explanation of the track actuator coil TC and the focus actuator coil FC, which is an exploded perspective view of one example of a lens actuator, which is provided in the optical head 2.

A magnetic circuit 201 is secured to a base 200, and a sliding shaft 202 erects in the center of the magnetic circuit 201. A rotating arm 203, which serves as a movable part, is provided on the base 200, Which serves as a stationary part. The track and focus actuator coils TC and FC are wound around a cylindrical portion 204 formed on the lower side of the rotating arm 203.

An objective lens 205 is attached to one end of the rotating arm 203, while a counter balance 206 is provided on the other end of the rotating arm 203. The objective lens 205 passes a spot of light from the laser light source and light reflected from the optical disk 1 toward the light detector 31.

Further, the center of the rotating arm 203 is fitted onto the sliding shaft 202 on the base 202 through a central axial hole. Thus, the rotating arm 203 is rotated around the axis by the track actuator coil TC and the magnetic circuit 201 and, at the same time, caused to slide axially by the focus actuator coil FC and the magnetic circuit 201.

Referring back to FIG. 2, the drive stage of each of the actuator coils TC and FC is provided with an overcurrent detector comprising the current sensor (14, 25), the rectifier/integrator (15, 26) and the comparator (16, 27).

The overcurrent detector detects an overcurrent of such a size that it is possible to decide from the presence of this overcurrent that there is an abnormal fault in the system, and that the actuator coil TC/FC may be damaged if this overcurrent is continuously passed therethrough over a predetermined period of time.

Figure 5:
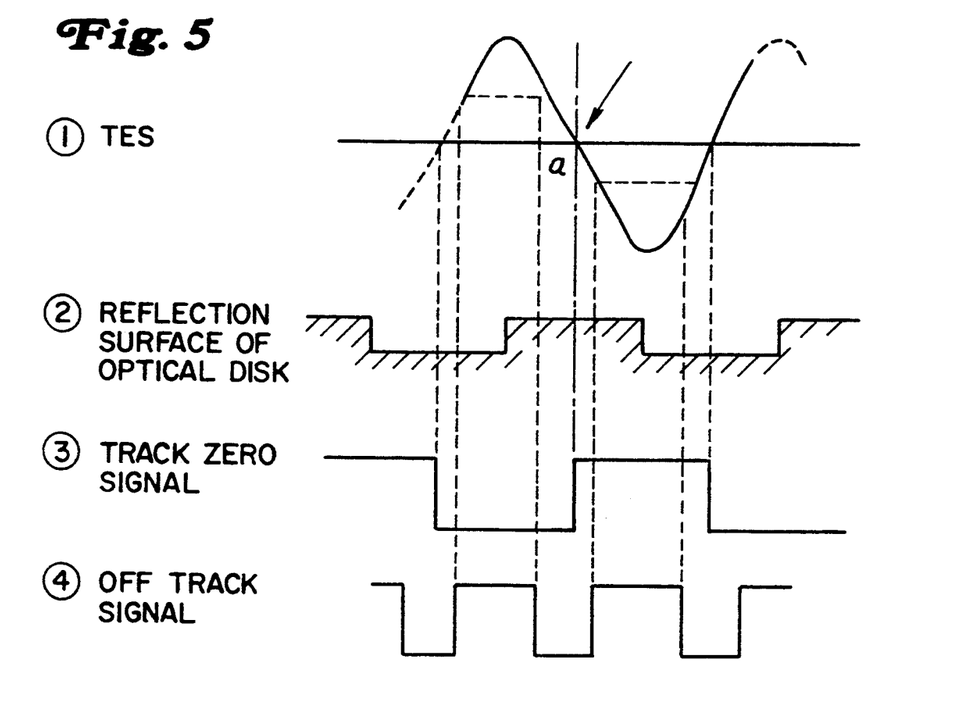
FIG. 5 shows the relationship between a track error signal TES and tracks.

The relationship between the track error signal TES and tracks is such as that shown in FIG. 5. FIG. 5①shows the track error signal TES; FIG. 5②shows the reflection surface of the optical disk 1; FIG. 5③ shows the track zero crossing signal; and FIG. 5④ shows the off track signal.

The point "a" in FIG. 5① is the target point of the servo-control when the track servo-loop is on. The point "a" corresponds to the central position of the land (raised portion) on the reflection surface of the optical disk 1 shown in FIG. 5②. As the light beam comes away from the point "a", the amplitude of the track error signal TES increases in either the positive or negative direction.

Figure 6:
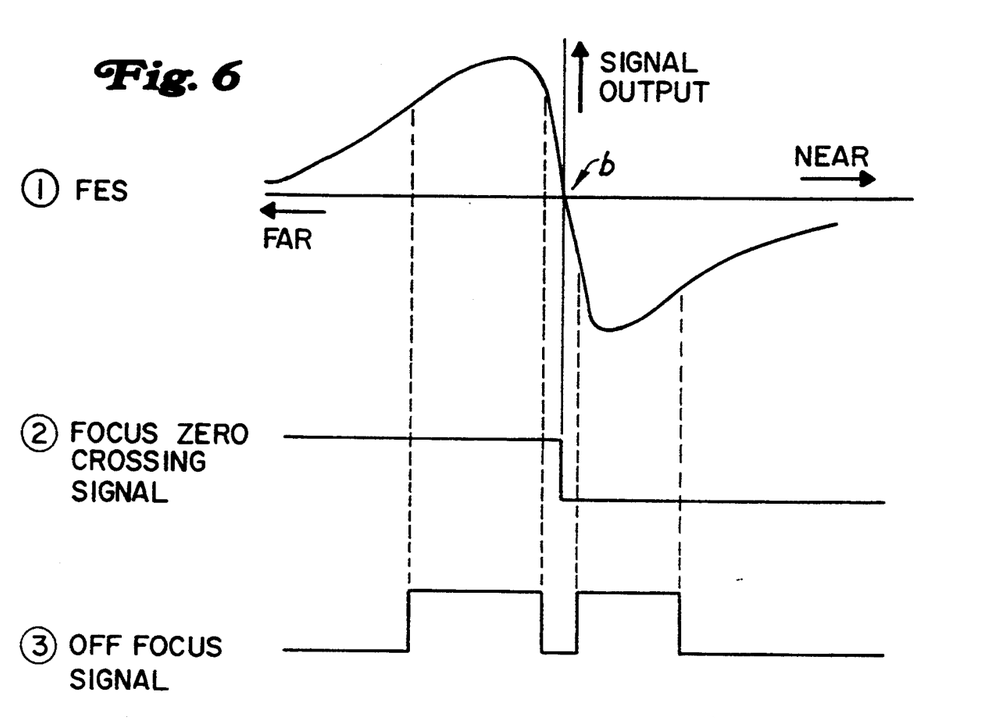
FIG. 6 shows the relationship between a focus error signal FES and the focal distance.

FIG. 6 shows the relationship between the focus error signal FES and the focus distance. FIG. 6 ① shows the focus error signal FES; FIG. 6 ② shows the focus zero crossing signal; and FIG. 6 ③ shows the off focus signal. The point "b" shown in FIG. 6 ① is a point of correct focus. As the light beam comes away from the point "b", the amplitude of the focus error signal FES increases in either the positive or negative direction. In other words, as the focus of the light beam becomes nearer to or farther from the reflection surface of the optical disk 1 than the point "b" (point of correct focus), the amplitude of the focus error signal FES changes as Shown in FIG. 6①.

Figure 7:
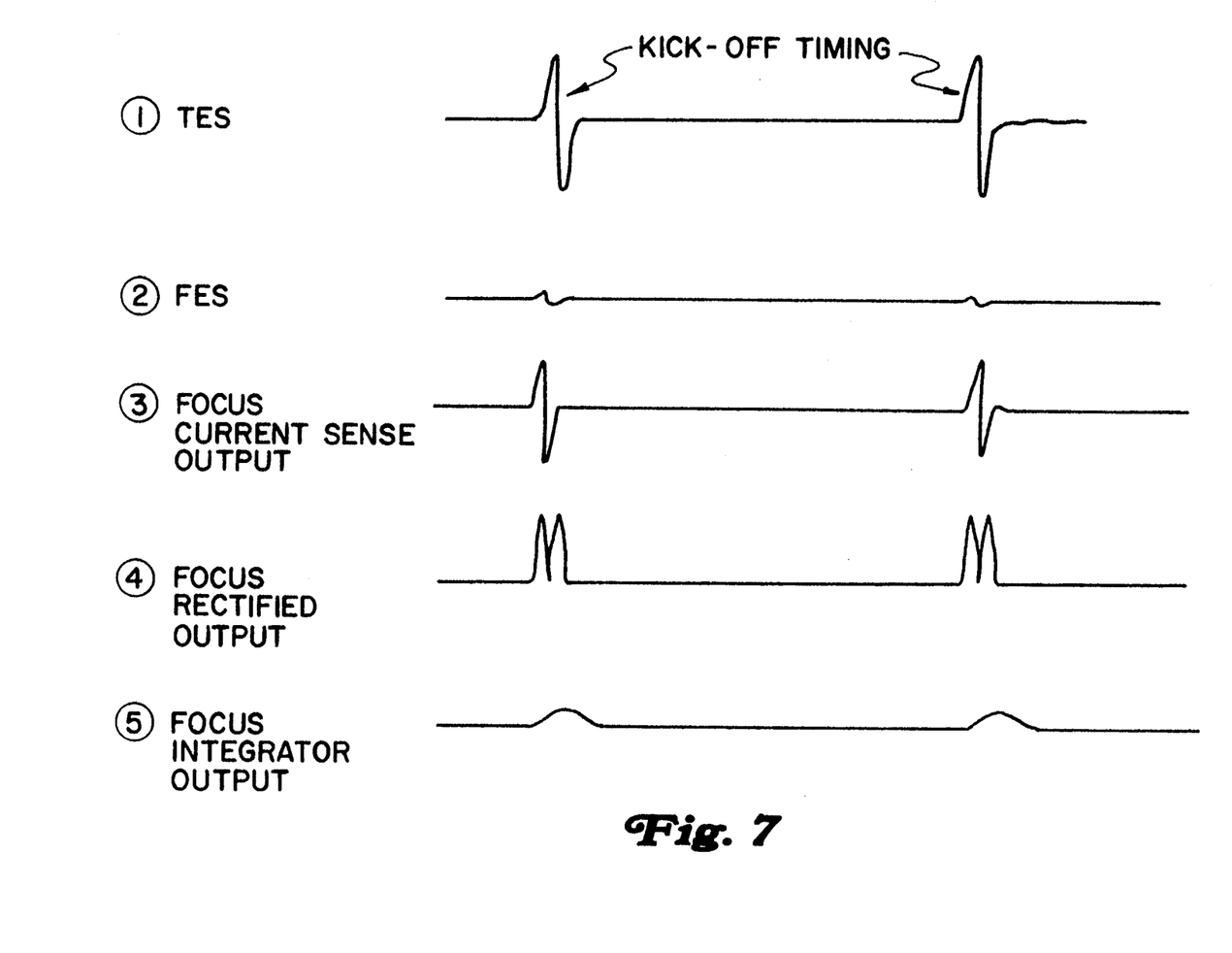

FIG. 7 shows waveforms that appear when the track servo loop is on, that is, when the switch 12 in the track servo loop, shown in FIG. 2, is closed. FIG. 7 ① shows the track error signal TES, and FIG. 7② shows the focus error signal FEB. FIGS. 7 ③, ④ and ⑤ respectively show the current sense output (the output of the current sensor 25), the rectified output (the rectified output signal in the rectifier/integrator 26) and the integrator output (the integrator output signal in the rectifier/integrator 26) of the overcurrent detector in the focus servo loop.

Since the optical disk 1 has tracks formed spirally in the surface thereof, as stated above, a kickback operation is carried out per revolution of the optical disk 1 in order to maintain the optical head 2 above the same track. Each time the optical head 2 crosses one track, a sine waveform such as that shown in FIG. 7① appears in the track error signal TES.

Further, at the timing at which the optical head 2 crosses a track, a crosstalk waveform appears in the focus error signal FES, although it is minute, as shown in FIG. 7②. At that time, since the focus error signal FES is amplified in the power amplifier 24 after the phase of the high-frequency component thereof has been advanced in the phase compensator 22, a large current flows through the focus actuator coil FC in the optical head 2.

In general, the system is designed so that even if such a large current flows, there is no adverse effect on the focus actuator coil FC when the track servo loop is on, that is, when the switch 12 is closed under control of the controller 3A in the arrangement shown in FIG. 2.

Figure 8:
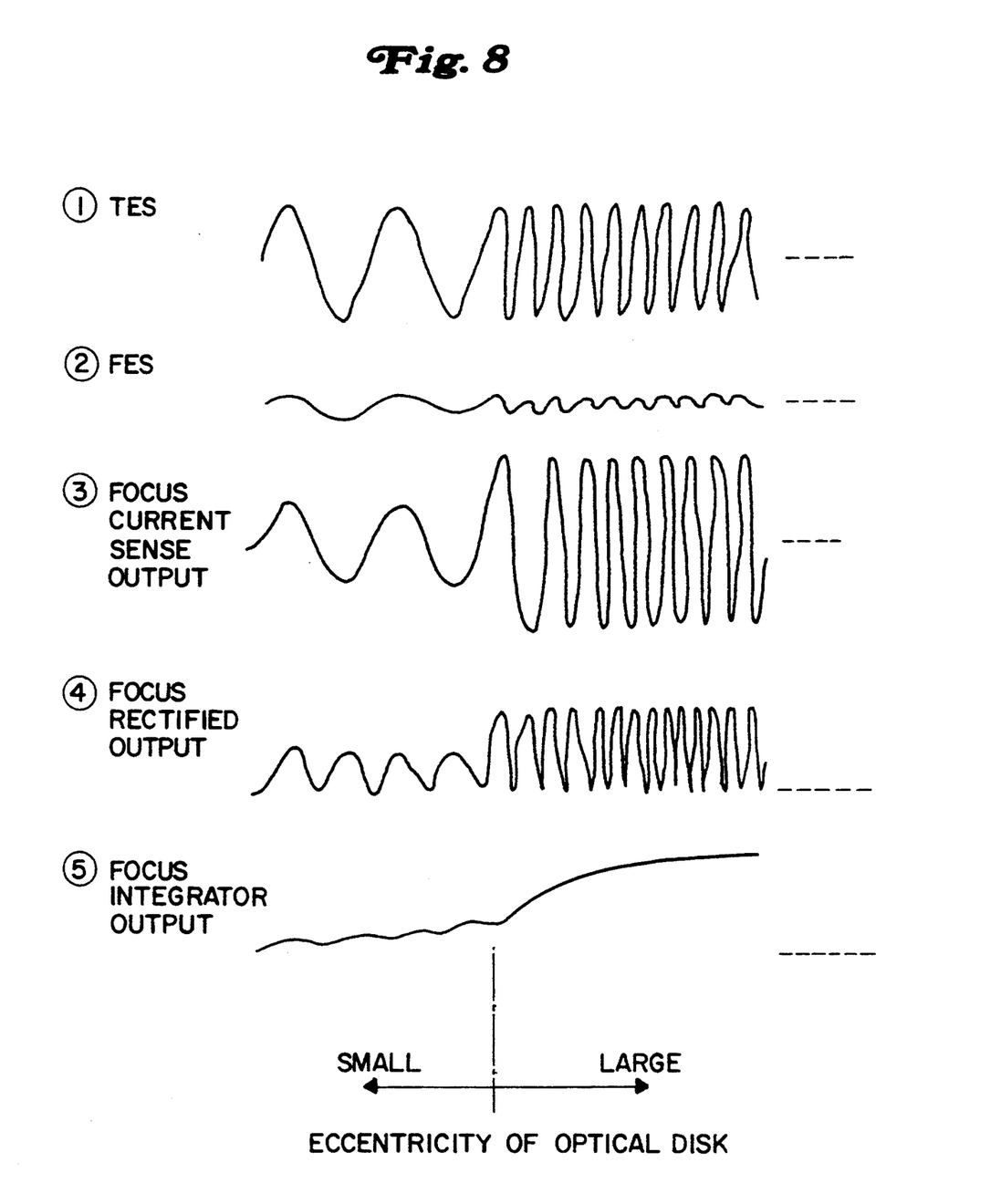
FIG. 8 shows waveforms appearing when the track servo loop is off.

However, when it becomes difficult to effect follow-up control for attaining the target value, the switch 12 is opened to turn off the track servo loop. In such a case, the waveforms shown in FIGS. 7 ① to ⑤ become disordered as shown in the corresponding FIGS. 8① to ⑤. In particular, when the optical disk 1 has a large eccentricity, the number of times the optical head 2 crosses a track increases, and the current flowing through the system becomes larger than in the case where the track servo loop is on.

If this state continues, the temperature of the focus actuator coil FC rises, causing the coil FC to be deteriorated, resulting in a decrease in the lifetime of the coil FC, as stated above.

In the meantime, the track and focus servo loops are provided with overcurrent detectors comprising the current sensors 14 and 25, the rectifier/integrator circuits 15 and 26, and the comparators 16 and 27, respectively, as described above. However, in such an overcurrent detector, the reference value for comparison in the comparator 27 is so set that overcurrent detector detects and cuts off a large current that may invite a situation which can be considered to be destruction of the system.

In other words, the above-described overcurrent detectors cannot detect an overcurrent which is at such a level that if this current continuously flows, the lifetime of the focus actuator coil FC is likely to decrease due to a rise in temperature of the coil FC.

First Embodiment of the Present Invention

Figure 9:
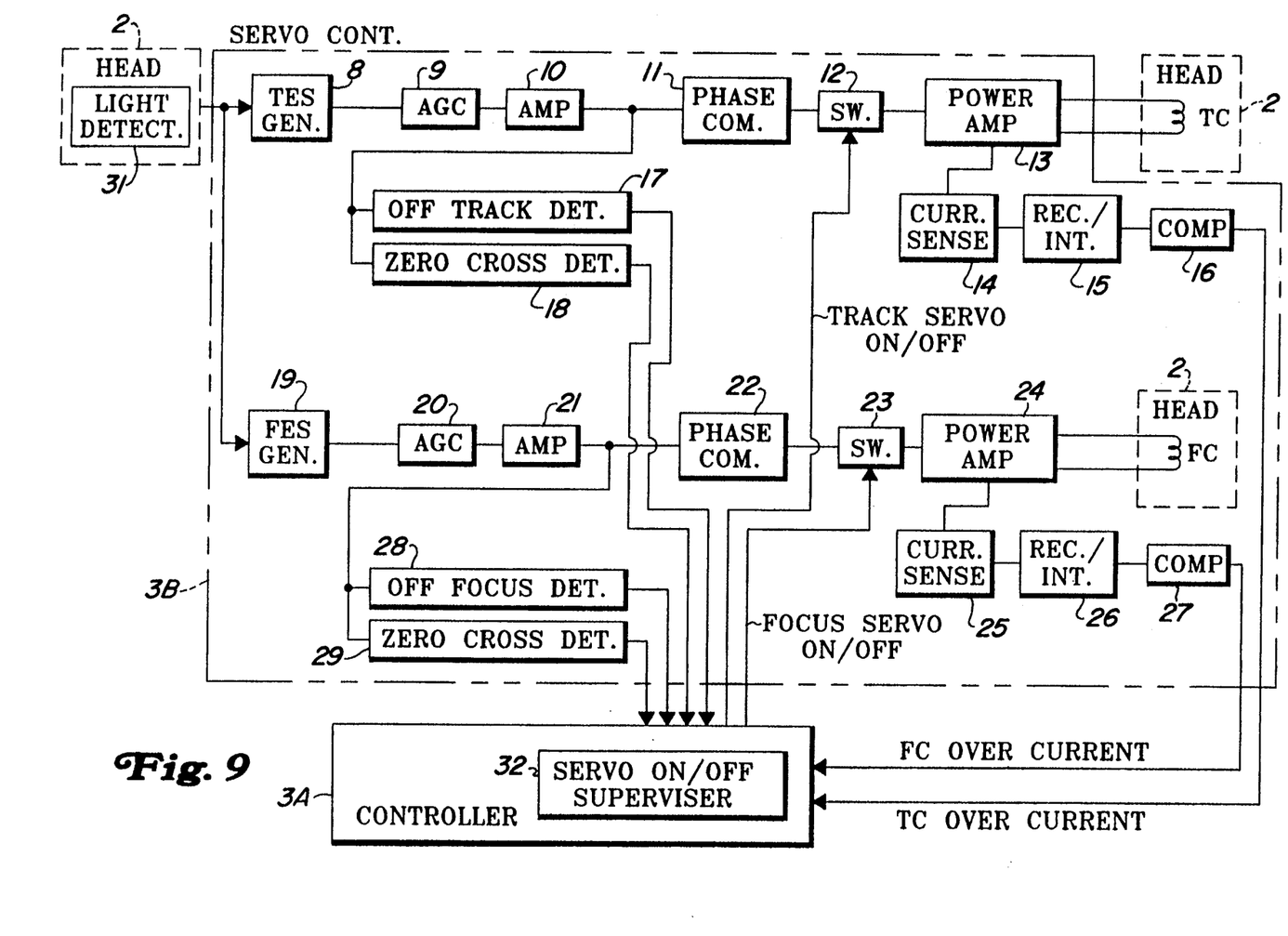
FIG. 9 is a block diagram showing the arrangement of a servo controller 3B according to a first embodiment of the present invention.

FIG. 9 is a block diagram of a first embodiment of the focus servo control system according to the present invention, which has an arrangement that eliminates the above-described problems of the conventional system. Accordingly, the first embodiment of the present invention differs from the conventional system, explained in connection with FIG. 2, in that a servo on/off superviser 32 is provided in the controller 3A so that when the track servo loop is off, no overcurrent will flow through the focus servo loop, thereby preventing deterioration of the focus actuator coil FC.

The arrangement of the rest of the system is basically the same as that of the conventional system in which the servo controller 3B has track and focus servo loops.

Figure 10:
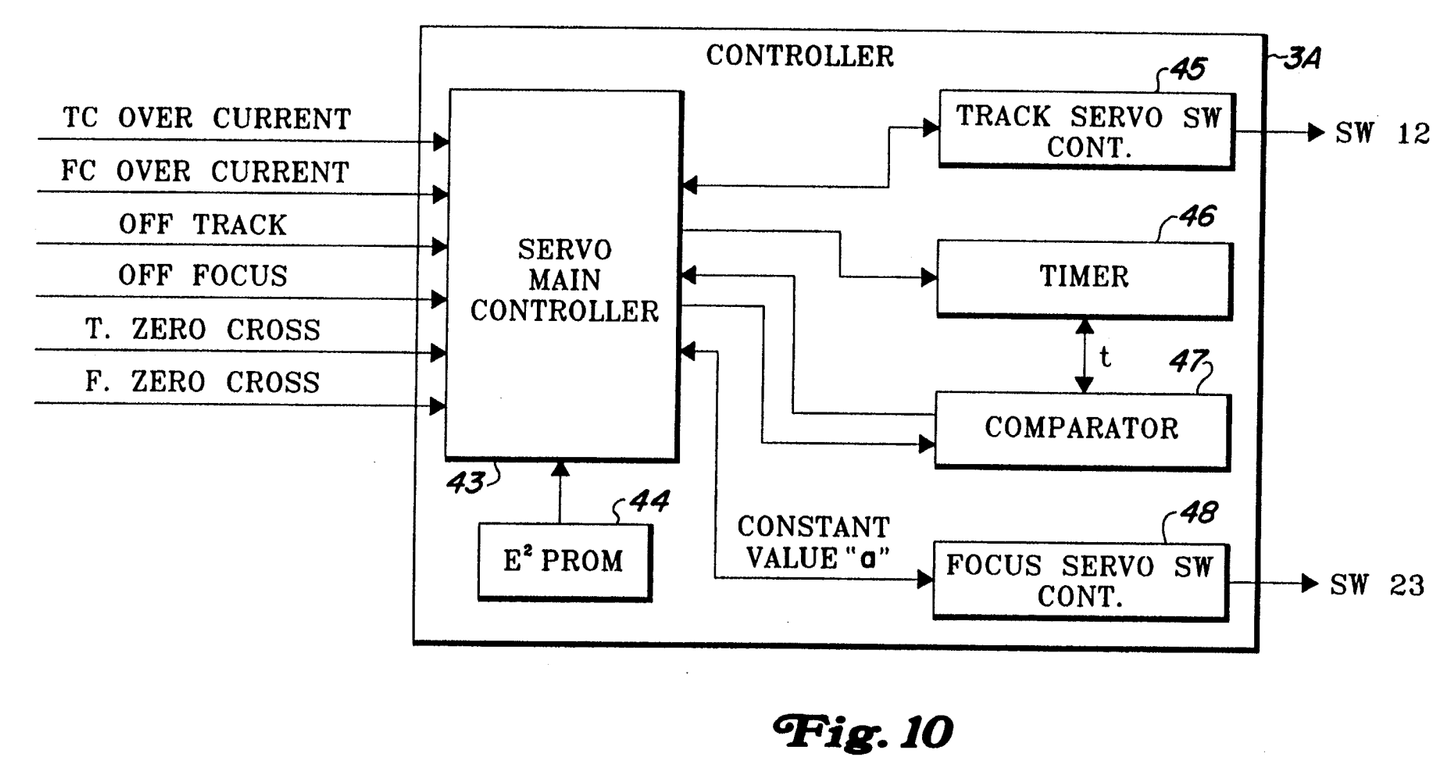
FIG. 10 is a block diagram showing the arrangement of a controller 3A according to the first embodiment of the present invention.

FIG. 10 shows a specific arrangement of the controller 3A including the servo on/off superviser 32 in the first embodiment of the present invention. As shown in FIG. 10, the controller 3A has a servo main controller 43, an E²PROM (electrically erasable programmable ROM) 44, a track servo switch controller 45, a timer 46, a comparator 47, and a focus servo switch controller 48.

Although the timer 46 and the comparator 47 are shown as being independent hardware circuits provided outside the servo main controller 43, it should be noted that these circuits may be formed from firmware as internal elements of the servo main controller 43 instead of the hardware circuits, as a matter of course.

The servo main controller 43 is, for example, a microprocessor controller (MPU) comprising a one-chip semiconductor IC. The servo main controller 43 is fed with the following input signals from the track servo loop, that is, an overcurrent signal TC from the comparator 16, an off track signal from the off track detector 17, and a zero crossing signal from the zero crossing detector 18. Further, the servo main controller 43 is fed with the following input signals from the focus servo loop, that is, an overcurrent signal FC, an off focus signal from the off focus detector 28, and a zero crossing signal from the zero crossing detector 29.

The E²PROM (electrically erasable programmable ROM) 44 is stored with preset data including a comparison time constant (a) set in the comparator 47. The track servo switch controller 45 controls on/off of the switch 12 in the track servo loop, that is, controls on/off of the track servo loop.

On the other hand, the focus servo switch controller 48 controls on/off of the switch 23 in the focus servo loop, that is, controls on/off of the focus servo loop.

The two switches 12 and 23 are similar in arrangement to each other. Although no specific illustration is given in the embodiment shown in FIG. 9, these switches each comprise an analog switch made up of CMOS.

In response to an instruction from the servo main controller 43, the comparator 47 reads out the comparison time constant (a) set and stored in the E²PROM 44 via the servo main controller 43 and compares it with the value of time measured by the timer 46.

In the arrangement shown in FIG. 10, the timer 46, the comparator 47, the E²PROM 44 and the servo main controller 43 constitute the servo on/off superviser 32 in the controller 3A shown in FIG. 9.

Next, the operation of the controller 3A shown in FIG. 10 will be explained with reference to the flowchart of FIG. 11.

It should be noted that the following operation flow is executed under control of a control program provided in the servo main controller 43 in the form of firmware.

After the power supply of the optical disk drive unit 33 has been turned on, the servo main controller 43 reads out the comparison time constant (a) from the E²PROM 44 and sets it in a register (not shown) provided in the comparator 47 (Step S1).

Next, if a command is issued from the upper-level controller 6 (Step S2), the servo main controller 43 executes the command (Step S8).

If no command is issued from the upper-level controller 6, the servo main controller 43 decided whether the track servo loop is on or off, that is, whether the switch 12 of the track servo loop is on or off (Step S3). This decision is made through the track servo switch controller 45. In a normal use state (a state where the servo main controller 43 waits for a command to be issued from the upper-level controller 6), the servo main controller 43 is in an idle state where it waits for a command and watches whether the track servo loop is on or off (that is, whether the switch 12 is on or off).

In this state, if the servo main controller 43 detects that the track servo loop has been turned off (Step S3), it is then decided whether the focus servo loop is on or off (that is, whether the switch 23 is on or off) (Step S4).

This decision is made by the servo main controller 43 through the focus servo switch controller 48. At this time, if the focus servo loop is off, nothing is executed, whereas, if the focus servo loop is on, the servo main controller 43 activates the timer 46 to start measurement of time (Step S5).

At the same time as the starting of the timer 46, the comparator 47 compares the time constant (a) set in the internal register with the time "t" being measured by the timer 46. The servo main controller 43 watches the result of the comparison made by the comparator 47 and waits for the condition of t≧a to be met(Step S6).

When the time "t" measured by the timer 46 becomes equal to or exceeds the time constant (a) (that is, t≧a), the servo main controller 43 sends an instruction to the focus servo switch controller 48 to turn off the switch 23 (Step S7).

Thus, the focus servo loop is turned off, and the supply of power to the focus actuator coil FC is stopped. In the above-described processing, if the track servo loop is turned on during the period of time from the starting of the timer 46 to the time when the condition of t≧a is met, the timer 46 is reset, and the process returns to Step S2. That is, the focus servo loop is turned off only when the track servo loop is off and the "on" state of the focus servo loop continues for the time (a) or longer than it.

After the focus servo loop has been turned off (Step S7), the timer 46 is reset, and the process then returns to Step S2.

Figure 11:
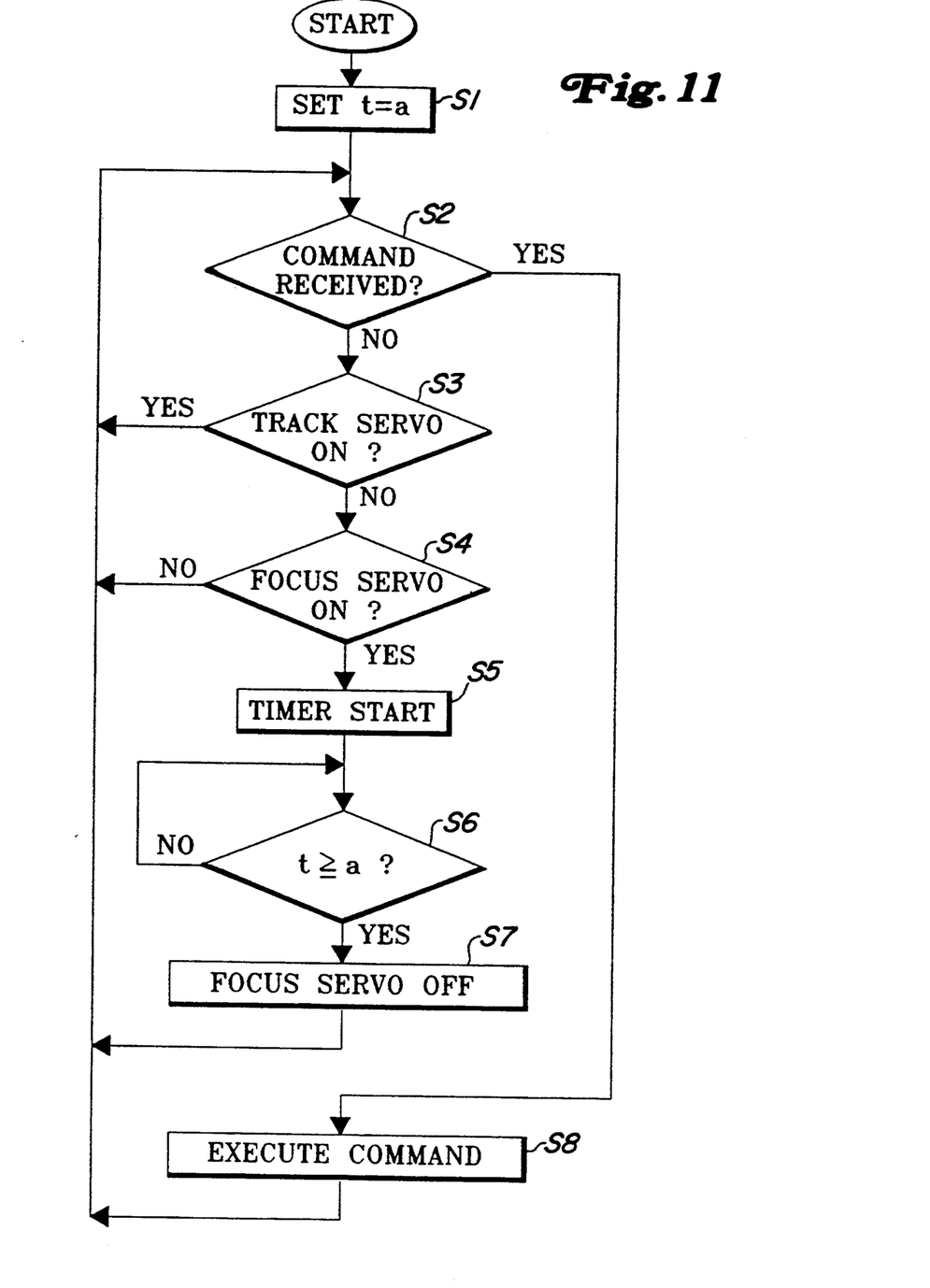
FIG. 11 is a flowchart showing the operation of the controller 3A according to the first embodiment of the present invention.

The above-described process flow, shown in FIG. 11, is continued as long as the optical disk drive unit 33 is supplied with power.

Second Embodiment of the Present Invention

Figure 12:
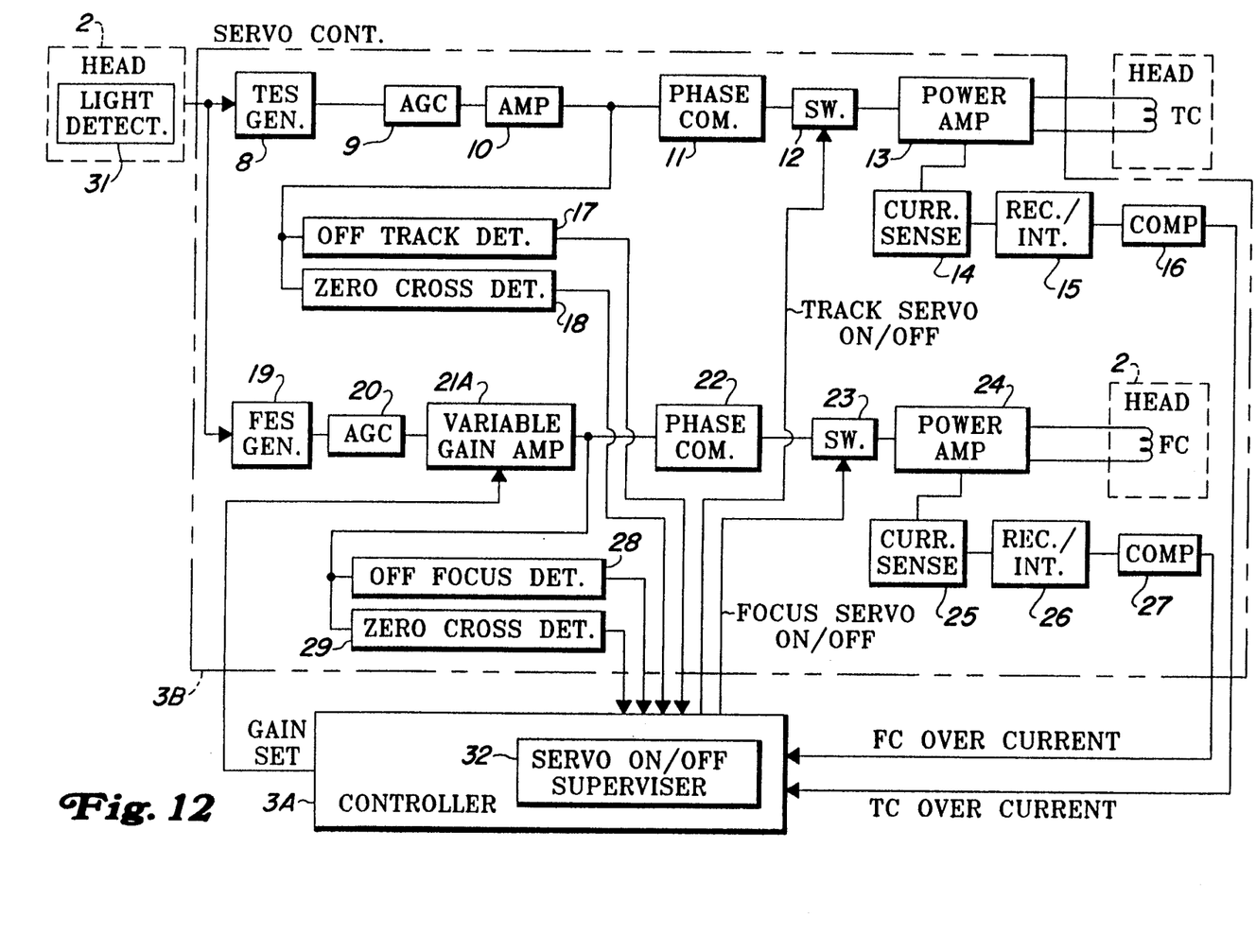
FIG. 12 is a block diagram showing the arrangement of a servo controller 3B according to a second embodiment of the present invention.
Figure 13:
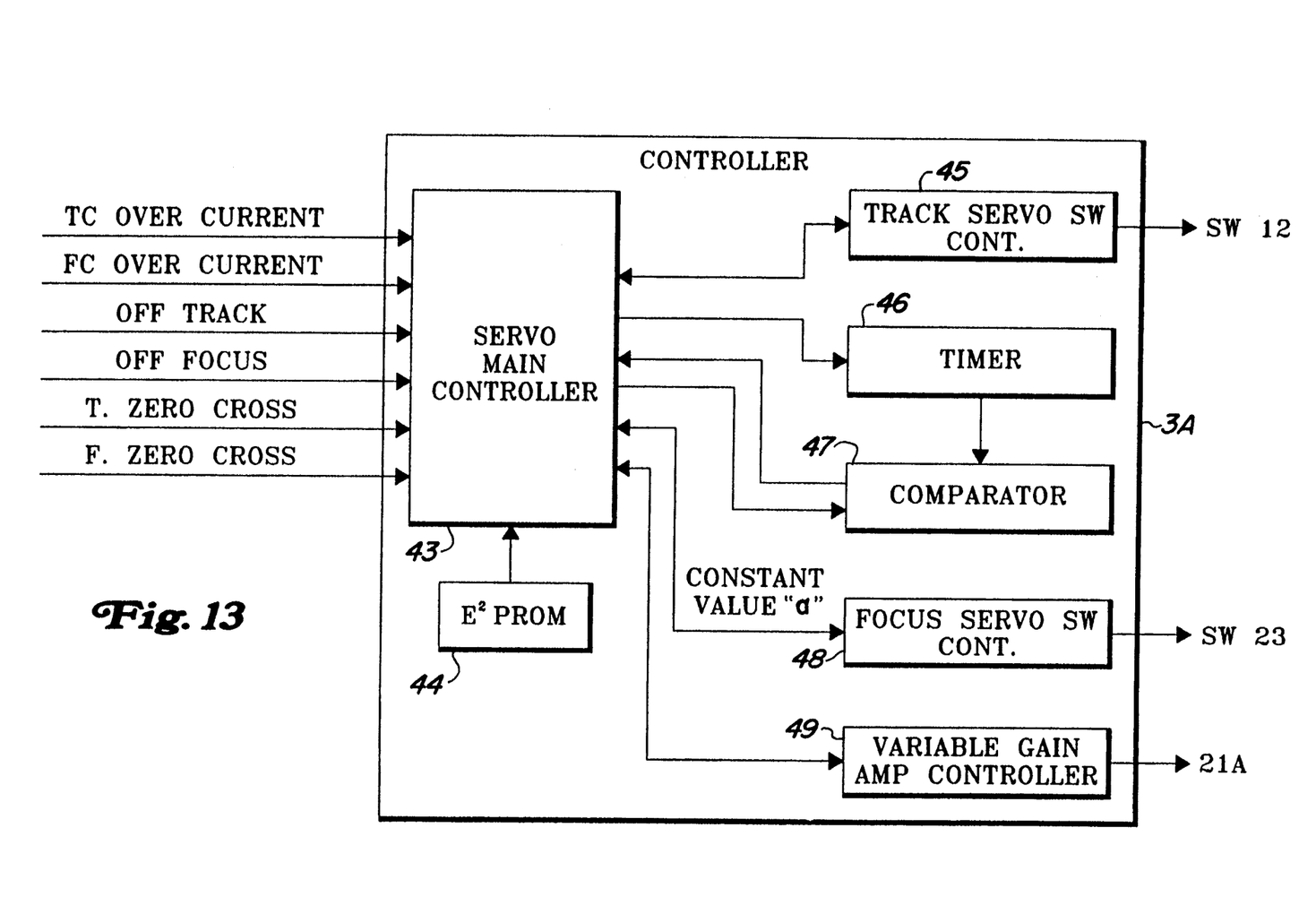
FIG. 13 is a block diagram showing the arrangement of a controller 3A according to the second embodiment of the present invention.
Figure 14:
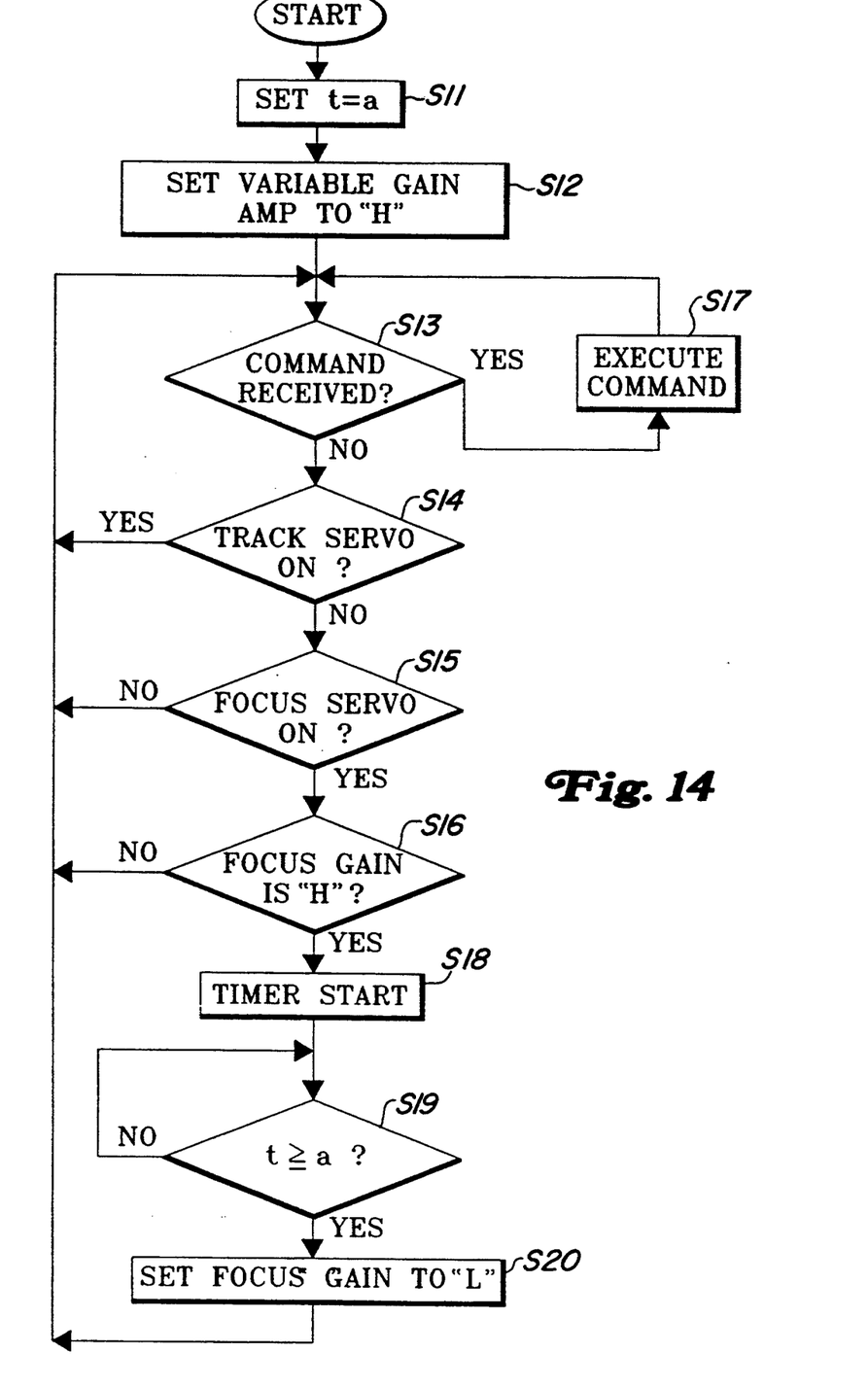
FIG. 14 is a flowchart showing the operation of the controller 3A according to the second embodiment of the present invention.

FIGS. 12 to 14 are views for explanation of a second embodiment of the present invention.

FIG. 12 is a block diagram of a servo controller 3B in the second embodiment of the present invention. In comparison to the first embodiment, shown in FIG. 9, the second embodiment is characterized in that the fixed-gain amplifier 21 in the focus servo loop shown in the block diagram of FIG. 9 is replaced with a variable-gain amplifier 21A. The second embodiment is further characterized in that the gain of the variable-gain amplifier 21A is controlled by the controller 3A instead of the on/off control of the switch 23 in the first embodiment. The arrangement of the rest of the second embodiment is the same as that of the first embodiment.

The control of the variable gain is effected, for example, by changing a high-level gain (H) (large gain) and a low-level gain (L) (small gain) from one to another. Such changeover of the gain of the variable-gain amplifier 21A is effected under control of the controller 3A.

A variable-gain amplifier controller 49 controls the gain of the variable-gain amplifier 21A in the focus servo loop. In the E²PROM 44 are set the time constant (a) and the gains "L" and "H". The system is arranged so that the servo main controller 43 can read these pieces of set data.

The arrangement of the rest of the controller 3A is the same as that shown in FIG. 10.

Accordingly, in contrast to the servo on/off superviser 32, which has been explained in connection with FIG. 10, the servo on/off superviser 32 (see FIG. 12) in the controller 3A of the second embodiment includes the variable-gain amplifier controller 49, which is additionally provided.

The operation of the second embodiment of the present invention will be explained below with reference to the flowchart of FIG. 14.

The following operation flow is executed under control of a control program provided in the servo main controller 43 in the form of firmware in the same way as in the case of the first embodiment.

After the power supply of the optical disk drive unit 33 has been turned on, the servo main controller 43 reads out the comparison time constant (a) from the E²PROM 44 and sets it in a register (not shown) provided in the comparator 47 (Step S11).

Further, the servo main controller 43 reads out the high gain "H" from among the gain quantities set in the E²PROM 44 and sends it to the variable-gain amplifier controller 49 so as to instruct it to set the gain of the variable-gain amplifier 21A to "H" (Step S12).

After the gain of the variable-gain amplifier 21A has been set as instructed under control of the variable-gain amplifier controller 49, the variable-gain amplifier 21A in the focus servo loop performs an amplifying operation with the high gain "H".

Next, if a command is issued from the upper-level controller 6 (Step S13), the servo main controller 43 executes the command (Step S17).

If no command is issued from the upper-level controller 6, the servo main controller 43 decided whether the track servo loop is on or off, that is, whether the switch 12 of the track servo loop is on or off (Step S14). This decision is made through the track servo switch controller 45. In a normal use state (a state where the servo main controller 43 waits for a command to be issued from the upper-level controller 6), the servo main controller 43 is in an idle state where it waits for a command and watches whether the track servo loop is on or off (that is, whether the switch 12 is on or off).

In this state, if the servo main controller 43 detects that the track servo loop has been turned off (Step S14), it is then decided whether the focus servo loop is on or off (that is, whether the switch 23 is on or off) (Step S15). This decision is made by the servo main controller 43 through the focus servo switch controller 48. At this time, if the focus servo loop is off, nothing is executed, whereas, if the focus servo loop is on, the servo main controller 43 decided whether or not the gain of the variable-gain amplifier 21A is at the high level "H" through the variable-gain amplifier controller 49 (Step S16).

If the gain of the variable-gain amplifier 21A is not at the high level "H" (that is, if it ms the low-level gain "L"), nothing is executed, whereas, if it is the high-level gain "H" the timer 46 is activated to start measurement of time (Step S18).

At the same time as the starting of the timer 46, the comparator 47 compares the time constant (a) set in the internal register with the time "t" being measured by the timer 4 The servo main controller 43 watches the result of the comparison made by the comparator 47 and waits for the condition of $t \geq a$ to be met (Step S19).

When the time "t" measured by the timer 46 becomes equal to or exceeds the time constant (a) (that is, $t \geq a$), the servo main controller 43 reads out the low-level gain "L" from among the gain values set in the $E^2$-PROM 44 and sends an instruction to the variable-gain amplifier controller 49 so as to set the gain of the variable-gain amplifier 21A to the low level "L" (Step S20).

Thus, the variable-gain amplifier 21A operates with the low-level gain (small gain). Consequently, the current at the output side thereof decreases. Accordingly, the current flowing through the focus actuator coil FC decreases.

In the above-described processing, if the track servo loop is turned on during the period of time from the starting of the timer 46 to the time when the condition of $t \geq a$ is met, the timer 46 is reset, and the process returns to Step S13. That is, the gain of the variable-gain amplifier 21A in the focus servo loop is reduced only when the track servo loop is off and the "on" state of the focus servo loop continues for the time (a) or longer than it, thereby minimizing the current flowing through the focus servo loop.

After the focus servo gain has been set to the low level "L" the timer 46 is reset (Step S20)

The above-described process flow, shown in FIG. 14, is continued as long as the optical disk drive unit 33 is supplied with power.

Although the present invention has been described by way of the first and second embodiments, it should be noted that the present invention is not necessarily limited to the described embodiments and that it also includes various other forms, such as those described below.

In the optical disk drive unit 33 shown in FIG. 1, the upper-level controller 6 may be provided separately from the optical disk drive unit 33. Further, the present invention may also be applied to a read-only optical disk drive unit 33, which has no write-circuit 4.

The timer 46 in the controller 3A, shown in FIGS. 10 and 13, may be arranged in the form of a delay circuit.

Further, although in the second embodiment the gain is set at either of two levels, i.e., low "L" and high "H", it should be noted that the present invention is not necessarily limited thereto and that three or more different levels of gain may be set.

What we claim is:

1. A focus servo control system for an optical disk drive unit, comprising:

a laser light source;

an optical disk having a data recording surface illuminated with a spot of light from said laser light source;

an optical head for receiving reflected light from said optical disk surface, which corresponds to said spot of light applied to said optical disk surface, and for obtaining an electric signal corresponding to said received light;

a servo controller having a track servo loop for moving said optical head radially of said optical disk on the basis of an error signal obtained from the electric signal obtained by said optical head and a focus servo loop for controlling the focus of said spot of light by moving said optical head perpendicularly to the surface of said optical disk on the basis of an error signal obtained from the electric signal obtained by said optical head; and a controller for detecting a length of time during which an "off" state of said track servo loop in said servo controller continues, and for turning off said focus servo loop when the detected length of time exceeds a predetermined value.

2. A focus servo control system as claimed in claim 1, wherein said track servo loop in said servo controller comprises a first error signal generator for generating a track error signal from the electric signal, obtained by said optical head, a first amplifier for amplifying said track error signal with a fixed gain, a first phase compensator for advancing the phase of a high-frequency component of an output of said first amplifier, a first switch on/off controlled by said controller, and a first power amplifier for power-amplifying an output of said first phase compensator received through said first switch, said focus servo loop in said servo controller comprises a second error signal generator for generating a focus error signal from the electric signal, obtained by said optical head, a second amplifier for amplifying said focus error signal with a fixed gain, a second phase compensator for advancing the phase of a high-frequency component of an output of said second amplifier, a second switch on/off controlled by said controller, and a second power amplifier for power-amplifying an output of said second phase compensator received through said second switch, and said optical head includes a track actuator coil driven by an output of said first power amplifier, and a focus actuator coil driven by an output of said second power amplifier.

3. A focus servo control system as claimed in claim 2, wherein said controller controls on/off of said track servo loop by turning on/off said first switch, and turns off said second switch when a length of time during which an "off" state of said first switch continues reaches a predetermined value.

4. A focus servo control system as claimed in claim 2, wherein said controller comprises a servo main controller, a track servo switch controller for turning on/off said first switch under control of said servo main controller, a focus servo switch controller for turning on/off said second switch under control of said servo main controller, an E$^2$PROM stored with a set value for "off" duration of said track servo loop, a counter activated and reset under control of said servo main controller, and a comparator for comparing a value of said counter with the value set and stored in said E$^2$PROM.

5. A focus servo control system as claimed in claim 4, wherein when said comparator detects that the value of said counter coincides with the value set and stored in said E$^2$PROM, said focus servo switch controller turns off said second switch under control of said servo main controller.

6. A focus servo control system as claimed in claim 4, wherein said counter and comparator are formed from firmware as a part of said servo main controller.

7. A focus servo control system for an optical disk drive unit, comprising:

a laser light source;

an optical disk having a data recording surface illuminated with a spot of light from said laser light source;

an optical head for receiving reflected light from said optical disk surface corresponding to said spot of light applied to said optical disk surface and for obtaining an electric signal corresponding to said received reflected light;

a servo controller having a track servo loop for moving said optical head radially with respect to said optical disk on the basis of an error signal obtained from the electric signal obtained by said optical head and a focus servo loop for controlling the focus of said spot of light by moving said optical head perpendicularly to the surface of said optical disk on the basis of an error signal obtained from the electric signal obtained by said optical head; and a controller for detecting a length of time during which an "off" state of said track servo loop in said servo controller continues, and for reducing a gain of said focus servo loop when the detected length of time reaches a predetermined value.

8. A focus servo control system as claimed in claim 7, wherein said track servo loop in said servo controller comprises a first error signal generator for generating a track error signal from the electric signal, which is obtained by said optical head, a first amplifier for amplifying said track error signal with a fixed gain, a first phase compensator for advancing the phase of a high-frequency component of an output of said first amplifier, a first switch on/off controlled by said controller, and a first power amplifier for power-amplifying an output of said first phase compensator received through said first switch, said focus servo loop in said servo controller comprises a second error signal generator for generating a focus error signal from the electric signal, which is obtained by said optical head, a second amplifier for amplifying said focus error signal with a variable gain, a second phase compensator for advancing the phase of a high-frequency component of an output of said second amplifier, a second switch on/off controlled by said controller, and a second power amplifier for power-amplifying an output of said second phase compensator received through said second switch, and said optical head includes a track actuator coil driven by an output of said first power amplifier, and a focus actuator coil driven by an output of said second power amplifier.

9. A focus servo control system as claimed in claim 8, wherein said controller on/off controls said track servo loop by turning on/off said first Switch, and reduces the gain of said second amplifier when a length of time during which an "off" state of said first switch continues reaches a predetermined value.

10. A focus servo control system as claimed in claim 8, wherein said second amplifier has two levels of gain, high and low and when the length of time during which an "off" state of said first switch continues reaches a predetermined value, the gain of said second amplifier is changed over to the low level.

11. A focus servo control system as claimed in claim 10, wherein said controller comprises a servo main controller, a track servo switch controller for turning on/off said first switch under control of said servo main controller, a focus servo switch controller for changing the gain of said second amplifier under control of said servo main controller, an E$^2$PROM stored with a set value for "off" duration of said track servo loop, a counter activated and reset under control of said servo main controller, and a comparator for comparing a value of said counter with the value set and stored in said E$^2$PROM.

12. A focus servo control system as claimed in claim 11, wherein when said comparator detects that the value of said counter coincides with the value set and stored in said E$^2$PROM, said focus servo switch controller sets the gain of said second amplifier to the low level under control of said servo main controller.

13. A focus servo control system as claimed in claim 11, wherein said counter and comparator are formed from firmware as a part of said servo main controller.

* * * * *